United States Patent [19]
Narita

[11] 3,906,317
[45] Sept. 16, 1975

[54] CONTROL FOR DC SERIES-WOUND MOTOR

[75] Inventor: Hiroshi Narita, Katsuta, Japan

[73] Assignee: Hitachi, Ltd., Japan

[22] Filed: Apr. 9, 1974

[21] Appl. No.: 459,400

Related U.S. Application Data

[63] Continuation of Ser. No. 300,889, Oct. 26, 1972, abandoned.

[30] Foreign Application Priority Data
Oct. 29, 1971  Japan.............................. 46-85511
Oct. 29, 1971  Japan.............................. 46-85512

[52] U.S. Cl. ............... 318/246; 318/139; 318/269; 318/356
[51] Int. Cl. ........................................... H02k 23/08
[58] Field of Search............ 318/246, 251, 269–271, 318/139, 356, 357, 358, 359, 338

[56] References Cited
UNITED STATES PATENTS
3,325,714   6/1967   Torii..................... 318/269
3,562,611   2/1971   Gurwicz............................ 318/246
3,651,390   3/1972   Vidal ..................... 318/269

*Primary Examiner*—B. Dobeck
*Attorney, Agent, or Firm*—Craig & Antonelli

[57] ABSTRACT

An apparatus for controlling the DC series-wound motor of an electric car or electric automobile by means of a thyristor chopper, characterized in that a commutating (auxiliary) thyristor of the thyristor chopper is connected in parallel with a field coil of the DC motor thereby to effect a field-weakening control of the motor.

15 Claims, 9 Drawing Figures

CONTROL FOR DC SERIES-WOUND MOTOR

This is a continuation of application Ser. No. 300,889, filed 10/26/72 and now abandoned.

The present invention relates to an apparatus for controlling the DC series-wound motor used with an electric car or electric automobile.

The torque characteristics of the electric car necessitates the exclusive use of a DC series-wound motor to drive it, and the regulation of the torque and speed is effected by a resistor and a contactor by means of which the resistor is inserted in the motor circuit. This conventional method has the disadvantage that continuous regulation is impossible and a large electric loss results from the presence of the resistor. Especially this disadvantage poses a big problem in a subway, in which the electric loss generates heat and increases the temperature of the whole subway system.

In view of this fact, an apparatus for controlling the DC motor by the use of a thristor chopper has been recently closely watched. The control apparatus for the DC motor using the thyristor chopper enable continuous control over the entire control range, thereby providing a great riding comfort with little thermal loss, making possible a cool subway system.

The present invention is characterized in that the armature of the DC motor is connected in series with a field coil thereof and a thyristor chopper to regulate the driving or braking force of the DC motor, that said thyristor chopper consists of series-connected two thyristors and a commutator for applying voltages in opposite directions to the thyristors when they conduct, and in that one of the thyristors is connected in parallel with the field coil.

The above and other objects, features and advantages will be made apparent by the detailed description taken in conjunction with the accompanying drawings, in which.

The manner in which the DC series-wound motor is regulated according to the present invention is roughly divided into two: one in the case of generating tractive force and the other in the case of braking the electric car. These two cases employ different electric circuits and therefore they will be explained below one by one.

Figure 1:
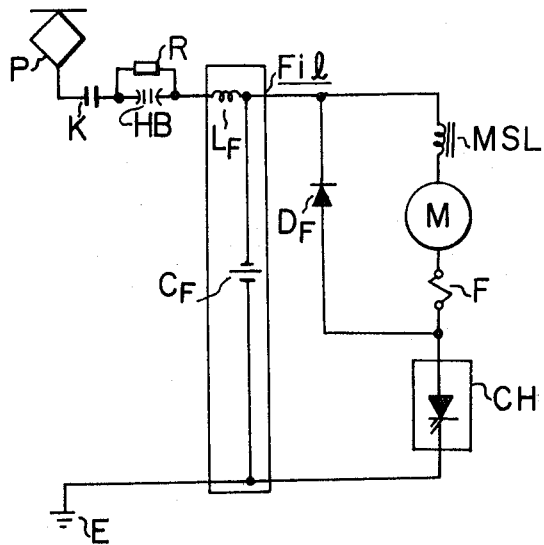
FIG. 1 is a diagram showing a conventional main circuit for starting and accelerating an electric car.

First, reference is made to the first case in which the electric car is accelerated. A main circuit shown in FIG. 1 is one actually used now for starting and accelerating the electric car.

In this figure, the reference symbol P shows a pantagraph and K a disconnecting switch for applying a voltage of the aerial wiring to the load. Symbol Fil shows a filter consisting of inductance $L_F$ and the capacitor $C_F$ for lessening the voltage of the aerial wiring and the pulsating current generated by the on-off control of the chopper CH. Symbol MSL shows a smoothing reactor for reducing the pulsating of the motor voltage and current generated by the on-off control of the chopper CH, and the reactor current is fed back through the motor and the flywheel diode $D_F$ while the chopper CH is turned off. The symbol HB shows a high-speed breaker which acts as a protecting device in case of failure in chopper commutation. Symbol R shows a current-limiting resistor for limiting current when the high-speed breaker is opened. In this case, the disconnecting switch K is operatively interlocked with the high-speed breaker to open the circuit after the limiting operation by the limiting resistor. Symbol M shows an armature of the motor, F a series-connected field winding, and E the earth.

Figure 2:
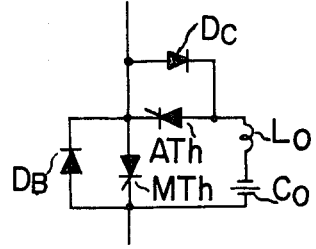
FIG. 2 is a diagram showing an example of the conventional chopper circuit.

A circuit diagram of FIG. 2 shows an actual example of the chopper circuit which comprises a main thyristor MT$h$, a commutating thyristor AT$h$, a commutating reactor $L_o$, a commutating capacitor $C_o$, a bypass diode $D_B$ and a commutating diode $D_C$. When conduction takes place in the main thyristor MT$h$, the chopper CH is turned ON, whereupon if the commutating thyristor is turned ON, a commutating current flows in the commutating circuit comprising $L_o$ and $C_o$, with the result that an inverted current causes the main thyristor MT$h$ and the commutating thyristor AT$h$ to be turned OFF with the chopper stopping its conduction. The bypass diode $D_B$ and the commutating diode $D_C$ constitute a path of the inverted current generated after the main thyristor MT$h$ and the commutating thyristor AT$h$ have been turned OFF, thereby accelerating the speed of recharging the commutating capacitor $C_o$.

In starting the electric car, the disconnecting switch K and the high-speed breaker HB are closed to effect the on-off control of the chopper CH. the current flow rate $r$ of the chopper CH is expressed as $r = Ton/(Ton + Toff) = Ton/T$ where $Ton$ is a period of time during which the chopper CH is ON, $Toff$ the one during which the chopper is OFF, and T a chopper control cycle expressed as $T = Ton = Toff$. On the other hand, the average value $V_M$ of the voltage applied to the main motor circuit is given by the equation $V_M = V_S \cdot r$ where $V_S$ is the aerial wiring voltage. From this equation, it will be apparent that the voltage $V_M$ applied to the main motor circuit is continuously regulated by continuously changing the chopper current flow rate $r$, making possible smooth starting and acceleration of the electric car.

Detailed explanation will be made now of the problem points posed by the above-mentioned chopper control circuit.

1. Relationship between minimum current flow rate $r_{min}$ and starting current The minimum current flow rate $r_{min}$ of the chopper depends upon the turn-off period of the thyristor. In other words, the minimum current flow rate $r_{min}$ in the chopper circuit of FIG. 2 occurs when the main thyristor MT$h$ and the commutating thyristor AT$h$ are turned ON simultaneously, that is to say, the minimum flow rate in this case depends upon the cycle of the commutating circuit comprising $L_o$ and $C_o$. This cycle is in turn determined by the turn-off time period of the thyristor, and therefore the shorter the time period during which the thyristor is turned off, the shorter the cycle, resulting in a lower current flow rate of the chopper.

The conventional large-capacity high-speed thyristor has a turn-off time of about 50 microseconds with the cycle of the commutating circuit equal to about 300 to 400 microseconds. The on-off control cycle of the chopper CH is considerably limited by ripples of the current in the main motor, ripples in the aerial wiring current and the inductive disturbance against an adjacent transmission circuit. In order to reduce these limitations, even the use of phase-difference regulation makes it necessary to maintain the control frequency of the chopper at about 200 Hz (equivalent to 5 ms of the control cycle T), in which case the minimum current flow rate of the chopper is $r_{min}$ = (300 to 400) microseconds/5000 microseconds
= 0.06 to 0.08

As a result, even when the voltage of the aerial wiring $V_s = 1500$ V and the resistance in the main motor circuit is $R_M = 0.2$ ohm, the required starting current $I_M$ is $$I_M = V_s \cdot r_{min}/R_M = 450 \text{ to } 600 \text{ A}$$

This is much larger than the starting current requirement of about 200 A in the conventional electric car employing a resistance control system.

In order to obviate this disadvantage, either (1) a starting resistor is inserted, or (2) the control cycle T of the chopper is increased only at the time of starting or (3) the starting operation is performed with the series-connected field weakened.

(2) Failure in chopper commutation

A failure of the chopper in commutation with both thyristors MT$h$ and AT$h$ turned ON causes the current in the main motor circuit to be increased sharply up to a level several times larger than the rated current thereof before the high-speed breaker HR is opened and the the current is limited by means of the resistor R. As a result, the shock to the mainmotor becomes excessive, posing the problem of adverse effect on the driving shaft and passengers.

(3) Problem of field weakening

On completion of total field acceleration after the maximum commutating rate of the chopper is achieved or when the speed of the main motor is achieved, it is necessary to effect the acceleration by field weakening control. This is achieved either (1) by the chopper connected in parallel with the series field winding, (2) by the aerial wiring connected with the series-connected chopper and field winding, or (3) by connecting a dividing resistor to the series field winding. All of these methods require an additional device, complicating the construction of the control circuit.

One of the objects of the present invention is to provide a motor control device without any of the above-mentioned disadvantages.

Figure 3:
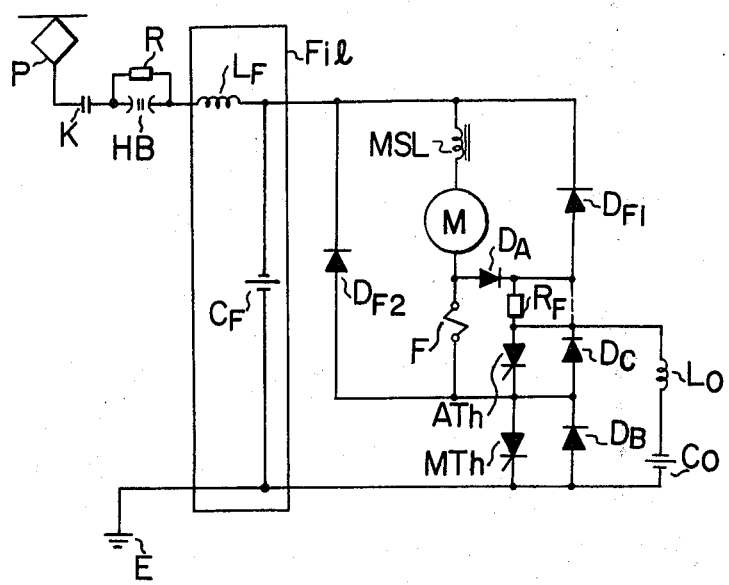
FIG. 3 is a circuit diagram showing an embodiment of the present invention.
Figure 4:
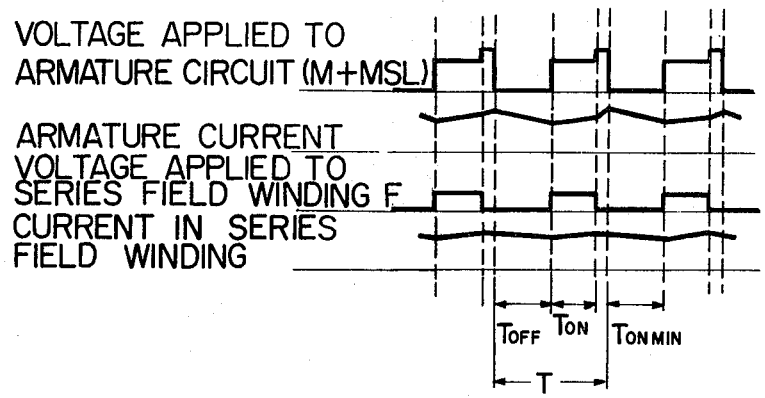
FIG. 4 is a diagram showing the waveforms of operation of the embodiment illustrated in FIG. 3.

A circuit diagram showing schematically an embodiment of the present invention is illustrated in FIG. 3, while the operation of this circuit is shown in waveforms in FIG. 4. Referring to FIG. 3, the main thyristor MT$h$, commutating thyristor AT$h$, bypass diode D$_B$, commutating diode D$c$ and the commutation circuit comprising L$o$ and C$o$ which together constitute the chopper CH are connected quite the same way as in FIG. 2, except that the main thyristor MT$h$ is connected in series with the motor circuit and the commutating thyristor AT$h$ in parallel with the series field winding F.

In FIG. 3, when the main thyristor MT$h$ is turned ON, the voltage of the aerial wiring is applied to the motor circuit as in the conventional circuit of FIG. 1, thereby to increase both armature current and current in the series field winding.

Conduction of the commutating thyristor AT$h$ causes the voltage applied to the series field winding F to be short-circuited, resulting in a proportionately higher voltage being applied to the armature circuit (M+MSL), so that the armature current is increased while the field current begins to be decreased in the loop F → AT$h$ → F. The diode D$_A$ and the resistor R$_F$ which were assumed to be absent in this embodiment will be explained later.

At the same time that the commutating thyristor AT$h$ is turned ON, oscillation occurs in the commutation circuit and the inverted current caused thereby turns OFF the main thyristor MT$h$ and the commutating thyristor AT$h$ to turn the chopper OFF. Accordingly, the armature current first flows in the loop M → L$o$ → C$o$ → E → P → K → HB → Fil → MSL → M and the commutating capacitor C$o$ is quickly charged by the voltage of the aerial wiring, followed by the circulation of current in the loop M → D$_{Fl}$ → MSL → M for decreased current. (Explanation will be made later of the diode D$_{F2}$)

On the other hand, the field current continues to be reduced by circulating in the loop F → D$c$ → F.

When the chopper CH is turned ON, that is, the main thyristor MT$h$ is made to conduct, the voltage of the aerial wiring is again applied to the motor circuit, whereby both the armature current and field current increase. This process is followed by the turning OFF of the chopper CH for repetition of the operation.

Let us consider the case in which the chopper is controlled at the minimum current flow rate, that is, when the main thyristor MT$h$ and the commutating thyristor are turned ON at the same time. The source voltage is applied only to the armature circuit (M+MSL) and magnetic energy is stored in the smoothing reactor MSL while the armature current is gradually increased. With the subsequent conduction of the commutating thyristor AT$h$, oscillation occurs in the commutation circuit (L$o$-C$o$) and the resulting inverted current cuts OFF both the main thyristor MT$h$ and the commutating thyristor AT$h$ and hence the chopper CH. As a consequence, the armature current is reduced in the loop M → D$_{Fl}$ → MSL → M due to the release of magnetic energy from the smoothing reactor MSL.

In this way, armature current flows but not any field current at the minimum current flow rate of the chopper CH, and therefore no torque is generated in the motor, preventing it from being started.

It will be noted from the above explanation that it is not necessary to reduce the current flow rate of the chopper since the electric car is not started even when the armature current determined by the minimum current flow rate of the chopper is as large as 450 to 600 A as mentioned above.

At a current flow rate of the chopper slightly higher than the minimum current flow rate thereof, the turning ON of the chopper causes a certain period during which only the main thyristor MT$h$ is ON and the voltage of the aerial wiring is applied to the armature circuit (M+MSL) and the series-wound field circuit, so that both the armature current and field current are increased. When the commutating thyristor AT$h$ is turned ON to cut off the chopper CH, the armature current is further increased while the field current begins to be reduced. Both armature current and field current are decreased by turning the chopper OFF, while they begin to be increased again when the chopper is turned ON. This process is repeated to control the armature current and current in the series-wound field.

Under this condition, if the time constant of the series-wound field circuit is set sufficiently large compared with the control cycle of the chopper, the total field state in which armature current is almost equal to field current is achieved when the current flow rate of the chopper becomes higher than its minimum current flow rate to a certain degree, that is, when the turn-on period of the main thyristor MT$h$ during which armature current and field current are increased becomes longer than a certain length.

In this case, if the current flow rate of the chopper is slightly higher than the minimum current flow rate thereof, a weakened field state in which the armature current is larger than the field current is naturally achieved, starting the electric car under the state of weakened magnetic field.

If, on the other hand, the time constant of the series-wound field circuit is not so great compared with the cycle of chopper control, it is difficult to achieve the total field state in which the armature current is almost equal to the field current, unless the current flow rate of the chopper is made considerably high. An effective method to achieve this is to connect the flywheel diode $D_{F2}$ in parallel with the series circuit consisting of the armature and the field winding as shown in the drawing.

As can be seen from above, in the embodiment of FIG. 3, a weakened field state in which armature current is larger than the field current is achieved when the current flow rate of the chopper is at its minimum level, while a total field state in which the armature current is almost equal to the field current is attained at a current flow rate higher than its minimum level, thus making possible the starting of an electric car under a weakened field state.

Also, since the series field winding F is connected with the commutating thyristor AT$h$, a failure of the chopper in commutation causes the series field winding F to be short-circuited, thereby reducing the field current with less torque generated in the motor than in the case of failure in commutation in the conventional circuit of FIG. 1. As a result, the adverse effect on the driving shaft and passengers is reduced.

At the maximum current flow rate of the chopper, the maximum speed of the motor is achieved under the total field state. Under this condition, field-weakening control is required, if the motor speed is to be further increased. For this purpose, the current flow rate of the commutating thyristor AT$h$ is changed with the main thyristor MT$h$ maintained ON by continuous application of a gate voltage thereto at the chopper current flow rate of unity. In the case where the main thyristor MT$h$ is maintained ON, the current flow rate of the commutating thyristor AT$h$ is equal to the minimum current flow rate of the chopper determined by the commutation time unless the control cycle of the chopper is changed. Therefore, by reducing the control cycle of the chopper or increasing the control frequency of the chopper, an increased current flow rate of the commutating thyristor AT$h$ makes possible a continuous field-weakening control.

For a motor with a small inductance of the series field winding F, the field tends to be excessively weakened during the commutation period when both the main thyristor MT$h$ and the commutating thyristor AT$h$ are ON. To prevent this situation, a resistor $R_F$ is connected in series with the commutating thyristor AT$h$. By doing so, the armature current is divided into the series field winding F and resistor $R_F$ even when the commutating thyristor AT$h$ begins to conduct, thereby preventing the series-wound field from being excessively weakened during the commutating operation. In order to achieve the weakened field state at the minimum current flow rate of the chopper, the resistor $R_F$ in series with the commutating thyristor AT$h$ must be smaller in value than the internal resistance of the field winding F. By making the value of the resistor $R_F$ smaller than the internal resistance of the series field winding, the amount of increase in the field current is kept smaller than that seen in the conventional circuit of FIG. 1 even if the chopper fails in commutation, with the result that the features of the present invention are not lost. Incidentally, the resistor $R_F$ is not exclusive to the present invention since it is used also in the conventional circuit of FIG. 1 for field-weakening control.

In the preceding embodiment, at the time of field-weakening control in the state where the armature current is larger than the field current, the difference between both of the currents flows through the commutation circuit ($L_o$-$C_o$), and therefore if the difference is sufficiently large, a charging voltage for the capacitor $C_o$ exceeds the voltage of the aerial wiring, making it necessary to make the breakdown voltage and current capacity of the chopper undesirably high. To overcome this problem, connecting the anode of the commutating thyristor AT$h$ and that of the diode $D_{F1}$ as shown by dashed lines causes the difference in current to flow through the resistor $R_F$ to the flywheel diode $D_{F1}$ and as a result, the charging voltage for the commutating capacitor $C_o$ is prevented from increasing beyond the voltage of the aerial wiring by being clamped by the flywheel diode $D_{F1}$.

Further, in this embodiment, when the main thyristor MT$h$ conducts, the commutating capacitor $C_o$ is discharged in the loop $C_o \rightarrow L_o \rightarrow R_F \rightarrow$ MT$h \rightarrow C_o$ until the voltage across it becomes equal to the terminal voltage of the field winding F. For this reason, in the case where the terminal voltage of the series field winding F is low because of a low internal resistance thereof, the need arises to enlarge the capacity of the commutating capacitor $C_o$ accordingly, resulting in a higher cost of the commutator.

The diode $D_A$ is provided for the purpose of preventing the undesirable discharge of the commutating capacitor $C_o$. Current flows in the diode $D_A$ only for a very short period of time during which the commutating thyristor AT$h$ is turned ON, and therefore it requires only a small current capacity, resulting a lower cost than when the capacity of the commutating capacitor $C_o$ is made large.

Figure 5:
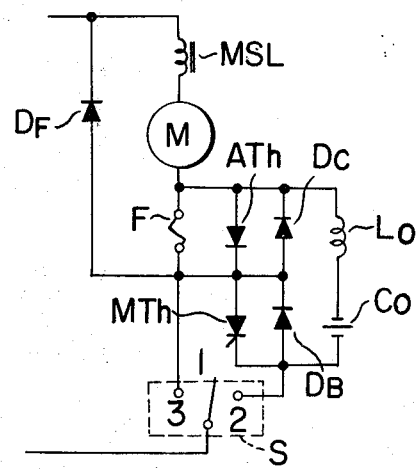
FIG. 5 shows another embodiment of the present invention.

Another embodiment of the present invention is shown in FIG. 5. As already explained, in the circuit of FIG. 3, the control cycle of the chopper, that is, the frequency thereof must be made small, since the field-weakening control after the maximum current flow rate of the chopper is achieved is effected by controlling the current flow rate of the commutating thyristor AT$h$. In the circuit of FIG. 5, by contrast, a change-over switch S is connected in series with the chopper circuit to control the current flow rate of the commutating thyristor AT$h$ without changing the control cycle of the chopper. In other words, in controlling the chopper under the total magnetic field state, the movable piece 1 of the switch S is closed on the side of the fixed piece 2 to obtain the same circuit as shown in FIG. 4, while in effecting the field-weakening control on completion of the state of total magnetic field, the movable piece 1 is closed on the side of the fixed piece 3 so that the parallel circuit consisting of the series field winding F and the commutating thyristor AT$h$ is connected in parallel with the series circuit consisting of the main thyristor MT$h$ and the commutating circuit $Lo$-$Co$. The current flow rate of the commutating thyristor AT$h$ is adjustable by changing the range of current flow in the commutating thyristor AT$h$, while the commutating thyristor AT$h$ is turned OFF by turning ON the main thyristor to generate oscillation in the commutating circuit $Lo$-$Co$. Thus, a chopper circuit is obtained in which the function of the main thyristor MT$h$ and the commutating thyristor AT$h$ shown in FIG. 2 are interchanged. In the chopper circuit of FIG. 5, therefore, the range of current flow in the main thyristor MT$h$ is controlled in the state of total magnetic field, while the range of current flow in the commutating thyristor AT$h$ is controlled for field-weakening control on completion of the state of total magnetic field.

Additional effects as mentioned below are produced in the starting and accelerating circuit described above. Although the conventional circuit of FIG. 1 requires a high value of the smoothing reactor in case of failure in chopper commutation, the present invention has an advantage of a lower value of the smoothing reactor MSL, since it can be determined taking into consideration the internal rectification of the motor. But the situation remains the same as that of the conventional circuit if only the main thyristor MT$h$ fails in commutation. To prevent this situation, the failure in commutation by the main thyristor MT$h$ is detected to forcibly conduct the commutating thyristor AT$h$.

Electric braking which is the second method of control according to the present invention will be now explained.

In the regenerative brake control of the DC series-wound motor by the use of a thyristor chopper (hereinafter referred to as "chopper regeneration"), it is necessary to maintain the voltage $E_M$ generated in the motor functioning as a series-wound generator at a level lower than the source voltage $E_S$. This is because if $E_S$ is lower than $E_M$, self-excitation of the series-wound generator causes the current to flow back toward the power supply regardless of the on-off operation of the chopper, thereby making it impossible to control the regenerative brake current.

Generally, the source voltage is set at the rated voltage of the motor and therefore chopper regeneration at a level under the rated speed is possible.

The series-wound motor for the electric car is sometimes accelerated to a level two or three times as high as the rated speed thereof by utilizing the field-weakening control during the power running of the electric car. Therefore, demand arises for effective control of the braking force by chopper regeneration even at a speed beyond the rated speed where $E_S$ is higher than $E_M$.

In order to effect chopper regeneration beyond the rated speed, the series field winding is subjected to the field-weakening control, for the purpose of which the various methods mentioned below have so far been suggested.

1. The series field winding is connected in parallel with a current-dividing resistor. This method makes possible only a stepped change in the field-weakening control rate. Also, when the field-weakening control rate is high, two or three steps for control are required, resulting in a drawback of the requirement for a number of switches.
2. A chopper exclusively used for field-weakening control is connected in parallel with the series field winding. This method adds to another chopper, resulting in a higher cost and complicated control circuit.
3. The chopper used for total field control is connected in parallel with the series field winding thereby to effect the field-weakening control. This method also complicates the circuit as it requires the use of a switch as well as the switching of a gate signal to the chopper. Further, it poses a technologically difficult problem as the method requires a quick response to the need for switching.
4. The series circuit consisting of a series field winding and the chopper is connected in parallel with the armature to form a shunt circuit for the field-weakening control. Although this method is characterized by a simple switching circuit as mentioned later, it is difficult to achieve a desired field-weakening rate of the field current at the minimum current flow rate of the chopper, and therefore it is necessary to insert a resistor in series.

The present invention provides an improvement on the circuit of (4) above. In other words, an object of the present invention is to provide a motor control device with a greatly improved field-weakening rate determined by the minimum current flow rate of the chopper, in order to effect, by means of a shunt circuit comprising a series field winding in series with the chopper, the field-weakening control of the series-wound motor by chopper regeneration.

Figure 6:
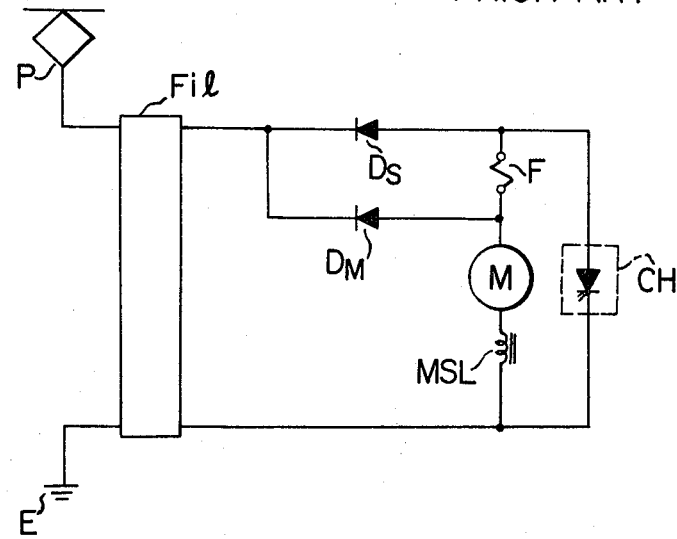
FIGS. 6 and 7 are diagrams showing conventional circuits for regenerative brake control of the DC series-wound motor by the use of a thyristor chopper.
Figure 7:
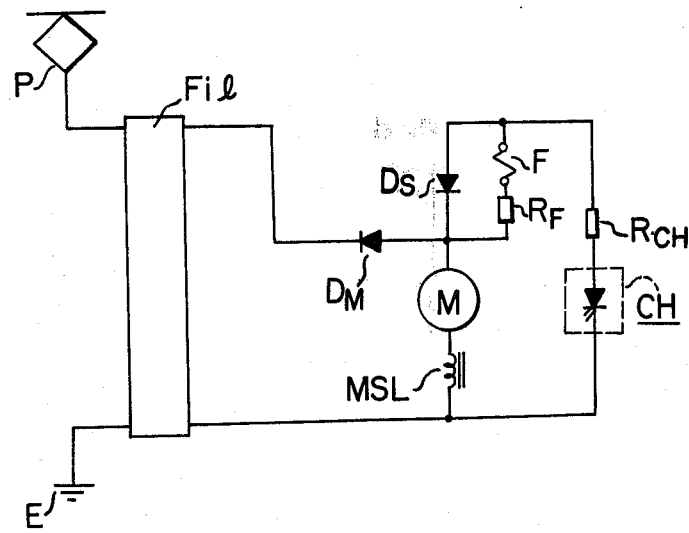

The present invention will be explained more in detail below with reference to the accompanying drawings. Prior art circuits for chopper regeneration are shown in FIGS. 6 and 7.

First, the operation of the circuit of FIG. 6 will be explained. At a motor speed below the rated value thereof where the voltage $E_M$ generated in the motor is lower than the voltage $E_S$ of the aerial wiring, the turning ON of the chopper causes the voltage $E_M$ to be short-circuited in the loop M → F → CH → MSL → M, and the motor current is gradually increased by storing its energy in the smoothing reactor MSL. When the chopper is cut off, the release of energy from the smoothing reactor MSL causes the motor current to flow in the loop M → F → Ds → Fil → P → E → MSL → M, and as a result it gradually is reduced. In other words, when the chopper is OFF, the motor current flows to the aerial wiring in the form of a regenerative current. The on-off operation of the chopper is repeated subsequently thereby to control the chopper current flow rate, so that effective regenerative brake control is continued until the motor almost stops.

On the other hand, at a motor speed higher than the rated value thereof where the voltage $E_M$ generated in the motor is higher than the voltage of the aerial wiring, the diode $D_M$ for the passage of the motor current is maintained conducted regardless of the ON or OFF state of the chopper CH, and part of the motor current is recirculated as a regenerated current to the aerial wiring directly. Since the diode $D_M$ is maintained conducted, a shunt circuit is formed in which both the armature circuit and the circuit consisting of the series field winding and the chopper are connected in parallel with the aerial wiring. Under this condition, if the chopper CH is turned ON, the voltage generated in the motor is short-circuited in the closed loop M → F → CH → MSL → M, and part of the motor current is recirculated to the aerial wiring in the form of a regenerated current, while the remainder flows to the chopper in the form of a field current, both of which gradually increases.

When the chopper CH is cut off, the motor current is recirculated to the aerial wiring while being gradually reduced. At the same time, the series field winding is short-circuited by forming a closed loop F → Ds → $D_M$ → F, whereby the field current is reduced. Consequently, the above-mentioned operation is repeated for regenerative brake control while satisfying the field-weakening condition that the armature current is larger than the field current. When the motor speed is reduced to a level below the rated value thereof, a switching is automatically made to the preceding control operation.

It will be understood that the circuit of FIG. 6 is characterized in that chopper regeneration is achieved automatically by series and shunt connections when the motor speed is higher and lower than the rated speed thereof respectively.

FIG. 7 shows how the chopper regeneration is effected by shunt connection regardless of the motor speed. In this figure, at a motor speed higher than its rated value under the turned-on state of the chopper, part of the motor current flows to the aerial wiring as a regenerated current through the loop M → $D_M$ → Fil → P → E → MSL → M and the remainder to the chopper CH in the form of the field current both of which gradually increase. When the chopper is cut off, by contrast, the motor current flows in the form of a regenerated current through the loop M → $D_M$ → Fil → P → E → MSL → M to the aerial wiring, while the field current circulates in the loop F → Ds → F. In the process, both of the currents are reduced. (Explanation of resistors $R_F$ and $R_{CH}$ has been omitted above.) Therefore, at a motor speed higher than the rated value, as in the case of the circuit of FIG. 6, the control operation is performed under the field-weakening state where the armature current is larger than the field current. When the chopper is in a conducting state at a motor speed below the rated value, the voltage generated in the motor is short-circuited in the closed loop M → F → CH → MSL → M, while at the same time the motor current, that is, field current is gradually increased with its energy being stored in the smoothing reactor MSL. When the chopper CH is in a cut-off state, on the other hand, the release of energy from the smoothing reactor MSL causes the motor current to flow in the form of a regenerated current in the closed loop M → F → $D_M$ → Fil → P → E → MSL → M, while the field current circulates in the closed loop F → $D_F$ → F. In the process, both the currents are reduced. In the latter case, if the time constant of the series-wound field circuit that is the closed loop F → $D_F$ → F is sufficiently large in comparison with the on-off cycle of the chopper CH, the field current is decreased less during the cut-off state of the chopper, thereby making possible the chopper regeneration according to the series-winding characteristics in which the armature current is almost equal to the field current. In the circuits of FIGS. 6 and 7, however, a problem mentioned below is presented at the time of field-weakening control by shunt connection at a high motor speed.

In the field-weakening control by shunt connection, the chopper is used to perform the control operation with the series field winding with a small internal resistance connected with the aerial wiring, and therefore, unless the minimum current flow rate of the chopper is sufficiently low, it is impossible to control the series field winding at a required weakening rate. As already mentioned, the minimum current flow rate of the chopper is not less than 0.06 to 0.08. Therefore, assuming that the voltage $Es$ of the aerial wiring is 1500 V and the internal resistance $R_F$ of the series field winding is 0.2 ohm, the minimum controllable field current $I_F$ min $$I_F \text{ min} = \frac{Es \times r_{min}}{R_F} = 450 \text{ to } 600 \text{ A}.$$

The rated current of the motor of 100 KW is about 400 A, and therefore the field current tends to become larger than the motor current. Actually, however, the diode $D_M$ is cut off in such a case, so that the motor current is not reduced below the field current.

As illustrated above, the field current is not reduced sufficiently small compared with the motor current even at the minimum current flow rate of the chopper, leading to the disadvantage that it is impossible to obtain a desired weakening rate.

A well-known method to cope with this problem consists in, as shown in FIG. 7, either connecting the resistor $R_F$ in series with the field winding F or connecting the resistor $R_{CH}$ in series with the chopper CH, thereby to obtain such a minimum field current $I_F$ min at the minimum current flow rate of the chopper that a desired weakening rate is achieved.

The resistor $R_F$ or $R_{CH}$ is required only at a high motor speed where $Es$ is higher than $E_M$ and they only contribute to a resistance loss, reducing the regenerative braking force, at a low motor speed where $Es$ is lower than $E_M$. Therefore, when the voltage $Es$ is higher than $E_M$, it is necessary to short-circuit the resistance $R_F$ or $R_{CH}$, as the case may be, with a contactor newly added to the circuit.

Figure 8:
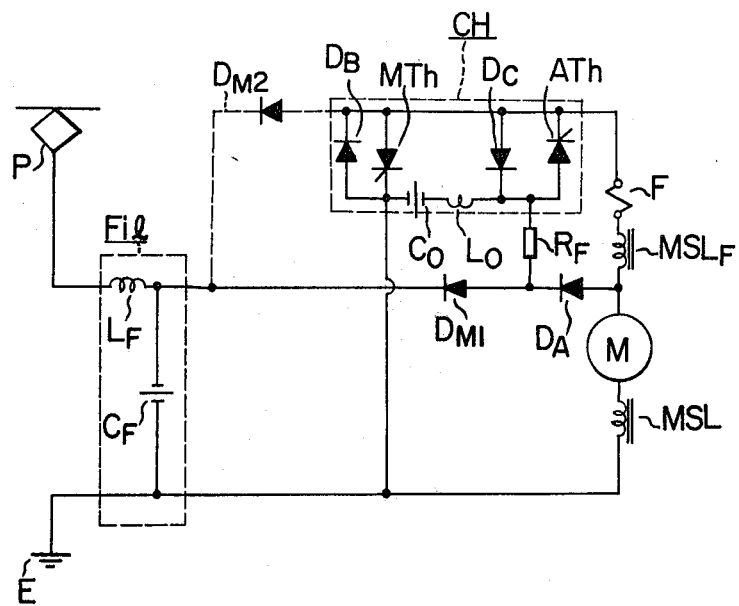
FIG. 8 is a diagram showing still another embodiment of the present invention.

The device according to the present invention has been developed in view of these disadvantages, and a circuit diagram showing an embodiment thereof is presented in FIG. 8. As will be clear from this figure, the commutating thyristor AT$h$ is connected in parallel with the field winding F to obtain the following effects:

1. The flywheel diode $D_F$ for the field winding may be omitted.
2. The field-weakening control is effected through the current dividing functions of the series field winding during the conduction of the commutating thyristor AT$h$, thus making possible a required field-weakening control without regard to the minimum current flow rate of the chopper.

The operation of the embodiment of FIG. 8 is such that, as in the circuit of FIG. 7, the regenerative braking control is effected with the motor wound in shunt over a broad range from the high speed running of the motor until its stoppage. When the chopper is ON, that is, when the main thyristor MT$h$ is ON at a motor speed beyond the rated value thereof, part of the motor current flows in the form of a regenerated current to the aerial wiring through the closed loop M → $D_{M1}$ → F$il$ → P → E → MSL → M, and the remainder in the form of a field current through the loop M → F → MT$h$ → MSL → M, while being gradually decreased. For convenience of illustration, the diode $D_A$, the resistor $R_F$ and the reactor MSL$_F$ were not referred to above.

Conducting the commutating thyristor AT$h$ to cut off the chopper, the field winding is short-circuited by the commutating thyristor AT$h$, and as a result part of the motor current which previously flowed as a field current flows in the loop M → AT$h$ → MT$h$ → MSL → M. The field current, on the other hand, decreases in the closed loop F → AT$h$ → F. At the same time that the commutating thyristor AT$h$ is turned ON, oscillation occurs in the commutation circuit L$o$-C$o$, whereupon an inverted current causes both the main thyristor MT$h$ and the commutating thyristor AT$h$ to be cut off, that is to say, the chopper is cut off.

With the chopper cut off, the motor current in the form of a regenerated current flows through the loop M → $D_{M1}$ → F$il$ → P → E → MSL → M to the aerial wiring, while the field current flows in the closed loop F → D$c$ → F, both currents being reduced in the process.

Now the relationship between the current flow rate of the chopper and the field-weakening rate will be discussed below. At the minimum current flow rate of the chopper where both the main thyristor MT$h$ and the commutating thyristor AT$h$ are turned ON, no current flows in the series field winding, and the weakening rate becomes theoretically 100%. Actually, however, the absence of current in the series field winding also results in the absence of the motor-generated current and hence the absence of a regeneraged current, so that the maximum field-weakening rate required of the motor is limited to a level which permits a regenerated current to flow at the maximum motor speed. The maximum field-weakening rate for the electric car is usually set at about 70 to 80%.

In the circuit of FIG. 8, when the current flow rate of the chopper is made higher than the minimum current flow rate thereof, that is, when the main thyristor MT$h$ begins to conduct prior to the commutating thyristor AT$h$, part of the motor current flows in the closed loop M → F → MT$h$ → MSL → M, while when the commutating thyristor AT$h$ is ON and the chopper is OFF, the current flows and decreases in the route $$F \to\ <\ {}^{ATh}_{Dc}\ >\ \to F.$$

If the time constant of this closed loop that is the field circuit is made sufficiently large compared with the control cycle of the chopper, the above-mentioned maximum field-weakening rate is obtained by the mere fact that the current flow rate of the chopper slightly exceeds the minimum rate thereof.

Further, according as the current flow rate of the chopper increases, the field-weakening rate lowers thereby to transfer to the stage of total field control in which the armature current is almost equal to the field current.

The embodiment of FIG. 8 is one in which a series circuit consisting of the commutating thyristor AT$h$ and a current-dividing resistor or reactor $R_F$ is connected in parallel with the series field winding F. In the absence of the dividing resistor, the field current is inconveniently reduced to zero at the minimum current flow rate of the chopper. Instead, the required maximum field-weakening rate is obtained at the minimum current flow rate of the chopper due to the presence of the resistor $R_F$.

The insertion of the current-dividing resistor $R_F$ lessens the time constant of the series-wound field circuit, whereas if it causes a sharp reduction in the field current during the cut-off of the chopper, a smoothing reactor MSL$_F$ may be inserted in series in the field winding as shown in the drawing.

Further, the embodiment of FIG. 8 is provided with a diode $D_A$ to prevent the discharge of the commutating capacitor C$o$. Otherwise, when the main thyristor MT$h$ conducts, electric charges stored in the commutating capacitor C$o$ are released to a level corresponding to the terminal voltage of the field winding F in the closed loop C$o$ → L$o$ → $R_F$ → MSL$_F$ → F → MT$h$ → C$o$. Therefore, if the terminal voltage of the field winding is low due to a low value of the internal resistance thereof, a need arises to increase the capacitor of the commutating capacitor C$o$ correspondingly, resulting in a higher cost of the commutator. This is the reason why the diode $D_A$ is provided for the purpose of preventing the discharge of the commutating capacitor C$o$. Provision of the diode $D_A$ is less expensive than alternatively enlarging the capacity of the commutating capacitor C$o$, because the diode $D_A$ requires only a small current capacity to accept a current which flows only for a short period of time during the conduction of the commutating thyristor AT$h$.

Explanation was made in detail above about the present invention with reference to chopper regeneration. The invention, however, is not limited to the chopper regeneration but also finds use in brake control for power generation with a chopper. In this case, a power circuit (including a filter circuit) in which a motor current is regenerated may be replaced by a braking resistor R as shown in the example of FIG. 9.

In the case of braking for power generation, there is no need to reduce the voltage generated in the motor to a level below the source voltage, and therefore for some motors it is possible to effect the braking control at a motor speed two or three times higher than its rated value without weakening the series-wound field. In such a case, a braking resistor R may be connected in parallel with the series circuit consisting of the armature M and the field winding F as shown by a dashed line in FIG. 9, in order to short-circuit the field winding F and prevent the breakdown of the thyristors in case of chopper failure in commutation, which otherwise might result from an eddy current or sudden change of the motor torque. For this purpose, the bypass diode $D_B$ of the chopper may be omitted.

Figure 9:
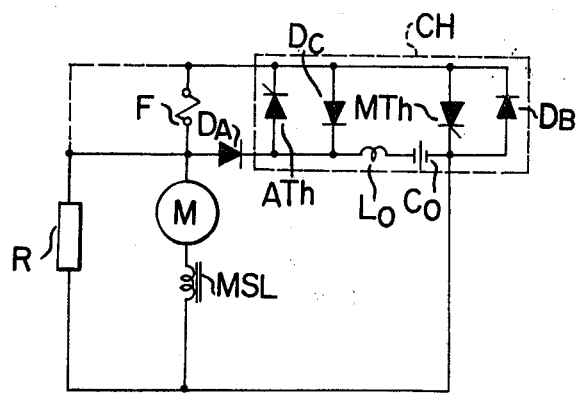
FIG. 9 is a diagram showing still another embodiment of the present invention.

In the embodiment of FIG. 9, the field winding F which is short-circuited only for a very short period during the conduction of the commutating thyristor AT*h* is little weakened.

Also, it is needless to say that the present invention is effectively applied to a vernier chopper.

Furthermore, it is possible to provide the device of the present invention with a re-adhesion characteristic by which if the motor skids, the main thyristor MT*h* is maintained OFF and the commutating thyristor AT*h* ON thereby to reduce the motor torque for repeated adhesion, preventing the skid. Moreover, it is needless to say that the present invention is effectively applied also to a chopper circuit employing an inversely-conducting thyristor containing the diodes $D_B$ and $D_c$.

What is claimed is:

1. An apparatus for controlling a DC series-wound motor comprising DC power supply means coupled to said DC series-wound motor for supplying power thereto, a first thyristor connected in series with the armature and field coil of said DC series-wound motor, a second thyristor connected in parallel with said field coil of said DC series-wound motor and connected in series with said first thyristor in the same direction for commutating said first thyristor, commutator means for applying a voltage to said first and second thyristors and for turning off both thyristors when both of said thyristors are rendered conductive, the polarity of said voltage being reverse to the polarity of said thyristors, and control means for applying a phase controlled firing signal to both of said thyristors.

2. An apparatus for controlling a DC series-wound motor according to claim 1, wherein said power supply means comprises a DC power supply connected to a series circuit of said armature, said field coil and said first thyristor.

3. An apparatus for controlling a DC series-wound motor according to claim 1, wherein said control means includes a chopper control device in which the frequency of the firing signal applied to said second thyristor is variable and the frequency signal is continuously applied to said first thyristor.

4. An apparatus for controlling a DC series-wound motor according to claim 1, further comprising a switching means for connecting to said DC power supply means, said series circuit consisting of said armature, said field coil and said first thyristor or said series circuit consisting of said armature and said field coil.

5. An apparatus for controlling a DC series-wound motor according to claim 1, further comprising a resistor inserted in a closed loop including said field coil and said second thyristor.

6. An apparatus for controlling a DC series-wound motor according to claim 1, further comprising a diode inserted in a closed loop including said field coil and said second thristor.

7. An apparatus for controlling a DC series-wound motor according to claim 1, further comprising a diode connected in parallel with said armature.

8. An apparatus for controlling a DC series-wound motor according to claim 1, further comprising a diode connected in parallel with a series circuit consisting of said armature and said field coil.

9. An apparatus for controlling a DC series-wound motor having an armature and field winding connected in series, the field winding having first and second terminals, the first terminal being connected to the armature, the apparatus comprising DC power supply means coupled to the DC series-wound motor for supplying power thereto, a first thyristor having first and second terminals with the first terminal being coupled to the second terminal of the field winding, a second thyristor having first and second terminals, the second thyristor being coupled across the first and second terminals of the field winding and having the first terminal thereof coupled to the second terminal of the first thyristor so as to form a series connection with the first thyristor in the same direction for commutating the first thyristor, commutator means for applying a voltage to the first and second thyristors and for turning off both thyristors when both of the thyristors are rendered conductive, the polarity of the voltage being reversed to the polarity of the thyristors, and control means for applying a phase control firing signal to both of the thyristors.

10. An apparatus for controlling a DC series-wound motor according to claim 9, wherein the commutator means are coupled to the second terminal of the first thyristor and the first terminal of the second thyristor.

11. An apparatus for controlling a DC series-wound motor according to claim 9, wherein the first terminals of the first and second thyristors are the anodes thereof and the second terminals of the first and second thyristors are the cathodes thereof.

12. An apparatus for controlling a DC series-wound motor according to claim 9, further comprising means for short-circuiting a circuit of the armature, the field coil and the first thyristor, the DC power supply means being connected to both terminals of the armature.

13. An apparatus for controlling a DC series-wound motor according to claim 9 further comprising means for short-circuiting a circuit of the armature, the field coil and the first thyristor, the DC power supply means being connected to both terminals of the series circuit of the armature and the field coil.

14. An apparatus for controlling a DC series-wound motor according to claim 9, further comprising means for short-circuiting a series circuit of the armature, the field coil and the first thyristor, and a braking resistor being connected to both terminals of the armature.

15. An apparatus for controlling a DC series-wound motor according to claim 9, further comprising means for short-circuiting a series circuit of the armature, the field coil and the first thyristor, and a braking resistor being connected to both terminals of a series circuit of the armature and the field coil.

* * * * *